United States Patent [19]
Toyoda et al.

[11] 3,922,427
[45] Nov. 25, 1975

[54] SYNTHETIC PAPER IMPROVED WITH RESPECT TO DUSTING TROUBLE

[75] Inventors: Takashi Toyoda; Tadayuki Fukada; Masayuki Inoue, all of Ibaraki; Shigeru Takayama; Hiroshi Yui, both of Yokkaichi; Takayuki Inoue, Yokkaichi, all of Japan

[73] Assignee: Mitsubishi Petrochemical Co., Ltd., Japan

[22] Filed: Dec. 12, 1974

[21] Appl. No.: 531,985

[30] Foreign Application Priority Data
Dec. 17, 1973 Japan............................ 48-139674

[52] U.S. Cl. ................ 428/308; 156/229; 264/289; 264/291; 428/309; 428/323; 428/910
[51] Int. Cl.²........................ B32B 5/16; B32B 5/26
[58] Field of Search ........... 264/289, 291; 156/229; 161/159, 160, 162, 402

[56] References Cited
UNITED STATES PATENTS

| | | | |
|---|---|---|---|
| 3,644,139 | 2/1972 | Schwarz | 161/160 |
| 3,758,661 | 9/1973 | Yamamoto et al. | 161/402 |
| 3,765,999 | 10/1973 | Toyoda | 161/159 |
| 3,783,088 | 1/1974 | Yoshiyasu et al. | 161/160 |
| 3,790,435 | 2/1974 | Tanaba et al. | 161/160 |
| 3,841,943 | 10/1974 | Takashi et al. | 161/160 |

*Primary Examiner*—William J. Van Balen
*Attorney, Agent, or Firm*—Robert E. Burns; Emmanuel J. Lobato; Bruce L. Adams

[57] ABSTRACT

A synthetic paper improved with respect to dusting trouble comprises a paperlike layer of a stretched film of an olefin polymer composition with inorganic fillers mixed therein, the olefin polymer being characterized in that a part thereof is an olefin polymer onto which an ethylenically unsaturated carboxylic acid, its anhydride, ester or amide has been graft copolymerized.

12 Claims, No Drawings

3,922,427

SYNTHETIC PAPER IMPROVED WITH RESPECT TO DUSTING TROUBLE

BACKGROUND OF THE INVENTION

The present invention relates to a synthetic paper substantially free of dusting trouble during a secondary processing.

Film of a thermoplastic resin containing finely divided fillers may be heated to an appropriate temperature and uniaxially or bi-axially stretched to form an opaque thermoplastic resin film. This film is similar in opaqueness, whiteness, texture and feeling to a natural or cellulosic paper and is known to be usable for the many applications wherein the conventional papers are used (reference: Japanese Patent Publication Nos. 40794/71 and 1782/74 and Japanese Patent Application Nos. 58902/70, 73214/70 and 73215/70). The reason why the film becomes opaque and white is that separation is caused at the interface between the resin and the filler on stretching of the film, and micro-interstices are created between the resin and filler on further stretching, microvoids containing the filler therein being developed through the depth of the film after the completion of the stretching. Further, microcracks develope on the surface of the film because the voids cannot maintain their shape on or near the surface of the film, whereby light is scattered on the surface of and within the film.

Because of the surface cracks and interior microvoids, the film can posses properties similar to those of a natural paper. However, when the opaque film (a synthetic paper) is subjected to the secondary processing such as printing, folding embossing, bookbinding, bagmaking and the like, the filler particles which have appeared on the free surface of the synthetic paper due to the surface cracks dropout and ahere to the secondary processing machines such as a roll and a blanket and interfere with the processing operation, which reduces remarkably the efficiency of the secondary processing. Accordingly, there has been an urgent need for solving this problem. In particular, in offset printing the fillers dropped out on the paper surface come off therefrom because of the high speed direct contact between a rubber blanket and the paper, transfer to the blanket, and enter into the ink on the blanket, which results in a great reduction in printing finish.

In order to prevent the reduction of printing finish, it has been necessary for printers to stop the printing machine for a time to clean the blanket and then to resume printing. Such a printing operation greatly reduces printing efficiency and leads to an increase in cost. Accordingly, there is an urgent demand for means for preventing fillers from coming off from synthetic paper.

SUMMARY OF THE INVENTION

It is an object of the present invention to prevent fillers from coming off from synthetic paper and to enhance greatly the efficiency of the secondary processing and to improve the quality of synthetic paper.

Accordingly, a synthetic paper improved in dusting trouble according to the present invention is a synthetic paper comprising a paperlike layer containing at least 10% of microvoids and consisting of a stretched film of an olefin polymer composition with inorganic fillers incorporated therein, characterized in that a part of said olefin polymer is an olefin polymer onto which an ethylenically unsaturated carboxylic acid, its anhydride, ester or amide has been graft copolymerized.

In accordance with the present invention, the dropping-out trouble of the fillers is remarkably reduced by adding a polarized olefine polymer which is an olefin polymer onto which an ethylenically unsaturated carboxylic acid, its anhydride, ester or amide has been graft copolymerized to an olefin polymer composition with inorganic fillers incorporated therein. The polarized olefin polymer is hereinafter referred to as a modified olefin polymer. The modified olefin polymer is composed of a main chain consisting of an olefin polymer and side chains comprising a polarizing group which is a carboxylic, a carboxylate ester, or a carbamoyl group. This polarizing group strongly adheres to the surface of the fillers added, while the polyolefin chain adheres to the olefin polymer as a main component resin of the film, thereby providing a strong bond between the resin and the fillers. Accordingly, in a region containing surface cracks as well as the interior of microvoids developed by stretching, the adherece of the dropped out filler particles to the surface of the film is strong, and thus the amount of the fillers picked up during printing or the secondary processing is reduced, which leads to a remarkably decreased frequency of trouble caused by the accumulation of free fillers.

Further, because the bonding force between the fillers and the resin is strong even in the interior of the microvoids, the mechanical properties such as tensile strength and tearing strength of the synthetic paper are greatly improved.

DETAILED DESCRIPTION OF THE INVENTION

The synthetic paper of the present invention is a synthetic paper comprising a paperlike layer consisting of a stretched film of an olefin polymer with inorganic fillers incorporated therein, a part of the olefin polymer being a modified olefin polymer.

The phrase "synthetic paper comprising a paperlike layer consisting of a stretched film of an olefin polymer with inorganic fillers incorporated therein" as herein used includes those of a laminate structure composed of a substrate layer with the stretched film secured to at least one of the surfaces thereof as well as those of a single layer structure composed of only a stretched film as mentioned above.

One example of such a laminate structure of the synthetic paper is disclosed in Japanese Patnet Publication No. 40794/71. In all cases, the synthetic paper of the present invention comprises the paperlike layer consisting of a stretched film having microvoids therein, the surface microvoids of which communicate with the outside. That is, the surface of the paperlike layer has microcracks.

Inorganic fillers

The inorganic fillers usable for the synthetic paper of the present invention may be any inorganic fillers which are used for conventional paperlike layers and synthetic papers as well as for cellulosic paper. Examples of such inorganic fillers are aluminum silicate, titanium oxide, barium sulfate, calcium carbonate, silica, alumina, silicates, and magnesium carbonate.

Of course, these fillers are in the form of powder, and the particle size of the powder preferably is in the range of from 0.3 to 20 microns and particularly preferably from 0.5 to 5 microns. In the case where the particle size of the powder is less than 0.3 micron, microvoids are not effectively developed, which leads to poor whiteness, and, further, the fillers form secondary agglomerates, which makes it difficult for the fillers to be dispersed into the resin. On the other hand, when the particle size of the powder is greater than 20 microns, the surface of shaped article is rough and the rate of formation of microvoids per unit weight of fillers is decreased.

Basically, the inorganic filler powder particles may assume any shape. Examples of such a shape are a sphere, bar, cone, and pyramid. However, from the standpoint of the formation of microvoids, the shape of the powder is preferably rugged.

The quantity of the inorganic filler to be blended with the olefin polymer desirably is in the range of from 5 to 65 parts by weight based on 100 parts by weight of the resulting olefin polymer composition after the blend. In the case where the quantity of the inorganic filler blended is less than 5 parts by weight, the resulting synthetic paper is poor in quality. That is, to meet the minimal requirements of whiteness, opacity, writability, and printability of the synthetic paper, the filler is preferably added in a quantity of no less than 5 parts by weight. On the other hand, when the quantity of the inorganic filler blended is greater than 65 parts by weight, forming into sheet or film of the resulting composition becomes difficult, and even if a paper could be shaped, the resulting paper will be unsatisfactory in strength and surface properties.

Modified olefin polymer

The modified olefin polymers usable for the present invention are olefin polymers onto which are ethylenically unsaturated carboxylic acid, its anhydride, ester or amide has been graft-copolymerized.

The olefin polymer which may be used in the present invention may basically be any olefin polymers which are used as substrates in conventional paperlike layers or synthetic papers. Examples of such an olefin polymer are $\alpha$-olefin homopolymers such as polyethylene, polypropylene and polybutene-1, propylene-ethylene copolymers and mixtures thereof.

The monomer suitable for modifying the olefin polymer may be any monomer capable of branching the polar or "acid" residue from the main chain so that the grafted side chain adheres to the inorganic filler to provide a strong bond between the olefin polymer and the filler. For this reason, monomers forming the "acid" residue with ease are preferably used. Accordingly, ethylenically unsaturated acids, their anhydrides, esters, and amides may be used as the monomer. Examples of these monomers are acrylic acid, maleic acid, maleic anhydride, itaconic acid, cis-4-cyclohexane-1,2,-dicarboxylic acid, acrylic esters, acrylamide, and the like. Above all, as a more effective modifying monomer against the dropping-out of the filler from the surface of the synthetic paper, mention may be made of ethylenically unsaturated acids and anhydrides thereof, particularly ethylenic $\alpha, \beta$ - dicarboxylic acids and anhydrides thereof, for example, maleic acid and maleic anhydride.

The above-mentioned modifier monomers may be graft copolymerized onto the olefin polymer by any of the conventional graft copolymerization methods. Representative examples of the graft copolymerization methods may be classified into the following types in terms of the type of initiation of a graft copolymerization:

i. A method using the irradiation of ionized radiation or ultra-violet rays reference: Japanese Patent Publication No. 8543/58), ii. A method using a radical initiator (reference: Japanese Patent Publication No. 11675/60), iii. A method using a peroxidation action by oxygen, ozone, heat, and the like reference: Japanese Patent Publication No. 26555/65), and iv. A method using heat and shearing force in a milling machine (reference: Japanese Patent Publication No. 18552/68).

Furthermore, the graft copolymerization methods may be classified into the following in terms of the mode of polymerization:

i. A method of graft polymerizing in a liquid state (reference: Japanese Patent Publication No. 15422/69), ii. A method of graft polymerizing in a slurry state (reference: Japanese Patent Publication No. 18144/68), and iii. A method of graft polymerizing in a molten state (reference: Japanese Patent Publication No. 27421/68).

The modified olefin polymer prepared by the above-mentioned methods may be a mixture of an olefin polymer onto which modifier monomers are graft copolymerized and an olefin polymer onto which no modifier monomer is graft copolymerized. However, it is impossible to define the quantity of the side chain having a residue of an acid in the olefin polymer onto which modifier monomers are graft copolymerized in terms of the weight percent of the graft copolymer itself in the modified olefin polymer. Thus, the quantity of the side chain is represented in terms of the weight percent of the modifier monomer graft polymerized based on the total weight of the modified olefin polymer (the rate of graft copolymerization). The term "the quantity of modifier monomer" as used throughout the specification including the appended claims refers to the weight percent (or weight part) of the monomer graft copolymerized with respect to the total quantity of the composition (thus, not based on the total weight of the modified olefin polymer).

In the olefin polymer composition with inorganic fillers incorporated therein according to the present invention, the content of the polymerized modifier monomer is preferably in the range of from 0.01 to 2.5 parts by weight based on 100 parts by weight of the inorganic fillers. In the case where the content of the modifier monomer is less than 0.01 parts by weight, the resulting composition cannot prevent dusting trouble. On the other hand, when the content of the modifier monomer is greater than 2.5 parts by weight, the resulting composition becomes inferior in stretching and moulding properties. The preferred quantity of the polymerized modifier monomer of course depends on the quantity of the inorganic filler. This is because the side chain having the residue of an acid in the graft polymerized olefin polymer adheres to the inorganic filler.

Olefin polymer

An unmodified olefin polymer may be added to a modified olefin polymer in order to control the quantity of the polymerized modifier monomer. The unmodified olefin polymer is an olefin polymer which has not undergone graft copolymerization.

The unmodified olefin polymer for controlling the quantity of the modifier monomer is basically the same olefin polymer as one serving to constitute the main chain of the modified olefin polymer. That is, the unmodified olefin polymers include all olefin polymers usable for preparing a paperlike layer or synthetic paper.

The unmodified olefin polymer may be the same as the olefin polymer constituting the main chain of the modified olefin polymer, or it may be different therefrom.

Composition

The olefin polymer with inorganic fillers mixed therein is a mixture of an inorganic filler, a modified olefin polymer, and optionally an unmodified olefin polymer. The method of mixing these constituents is not critical. Examples of the mixing method are as follows.

1. A method of mixing the powders of the inorganic filler, the modified olefin polymer, and optionally the unmodified olefin polymer in a mixer.
2. A method comprising mixing the pellets of the inorganic filler, the modified olefin polymer and optionally the unmodified olefin polymer, and casting the mixture into a sheet through an extruder.
3. A method comprising mixing the powders of the inorganic filler and optionally the unmodified olefin polymer with the pellets of the modified olefin polymer, pelletizing the resulting mixture, and casting the pellet into a sheet through an extruder.
4. A method comprising mixing the modified olefin polymer and the inorganic filler, then optionally mixing the resulting mixture and the unmodified olefin polymer, pelletizing the resulting mixture, and casting the pellet into a sheet through an extruder.
5. A method comprising mixing the modified olefin polymer and the inorganic filler, pelletizing the resulting mixture, mixing the pellet and the unmodified olefin polymer, and casting the resulting mixture into a sheet through an extruder.

Forming into paperlike sheet

The composition thus prepared may be formed into sheet and the sheet may be stretched to produce a synthetic paper. It is essential for this synthetic paper that the microvoid content of the paperlike layer providing the advantage of the present process be not less than 10%. This is because the present invention contemplates preventing the dropping-out of the fillers from the surface cracks of the synthetic paper. A synthetic paper (or a paperlike layer) containing no surface crack or having a low content of microvoids (the surface crack is proportional to the microvoid content) cannot provide the improvement in accordance with the present invention.

The rate of stretch of the composition can be determined at will depending on the type and function of a synthetic paper.

For example, a synthetic paper composed of a single layer may be prepared by any of the following methods.

1. First, the inorganic filler, the modified olefin polymer, and optionally the unmodified olefin polymer are mixed together, and the resulting mixture is milled in an extruder and then formed into a sheet. This sheet is stretched at least 3.5 times in the transverse or longitudinal direction.
2. The same composition as described above is formed into a sheet and the resulting sheet is stretched at least 3.5 times in the longitudinal and transverse directions, respectively. In the stretching process, the longitudinal and transverse stretchings may be carried out simultaneously or successively.

A synthetic paper composed of multiple layers may be prepared by any of the following methods.

1. To a thermoplastic resin is added the inorganic filler, the modified olefin polymer and the like, if desired, and the resulting mixture is milled in an extruder and formed into a sheet. The sheet is stretched at least 1.3 times in the longitudinal direction, and, thereafter, a mixture of the inorganic filler, the modified olefin polymer and optionally the unmodified olefin polymer is milled in an extruder and melt-extruded on one or both surfaces of the sheet through the extruder to produce a laminate sheet. The resulting multi-layer sheet is stretched at least 3.5 times in the transverse direction.
2. The sheet having the composition described above is laminated with a sheet obtained from a mixture of the inorganic filler, the modified olefin polymer and optionally the unmodified olefin polymer and the resulting laminate is stretched at least 1.3 times and at least 3.5 times in the longitudinal and transverse directions, respectively (in the case of stretching the single direction, stretching is carried out at least 3.5 times). The paperlike layer of the synthetic papers (1) and (2) has a microvoid content of at least 10%.

In order to indicate more fully the nature and utility of the present invention more clearly, it will be concretely illustrated by experimental examples as set forth below. It is to be understood that these examples are merely specific embodiments of the present invention and that various modifications can be made therein within the purview of the present invention.

Example 1

1. Polypropylene having a melt indes (MI) of 0.8 was mixed with 5% by weight of clay having an average particle size of $1\mu$. After being milled in an extruder set at a temperature of 270°C, the resulting mixture was melt-extruded through the extruder and cooled by means of a cooling device to prepare an unstretched sheet. After being heated to a temperature of 140°C, the sheet was stretched 5 times in the longitudinal direction.
2. 100 parts of polypropylene having a M.I. of 0.6, 10 parts of meleic acid, and 5 parts of benzoyl peroxide (BPO) were reacted together in a medium of 600 parts of xylene at a temperature of 120°C for 5 hours (all parts being be weight), and the resulting reaction mixture was re-precipitated with a large excess of acetone to prepare a powdery polypropylene modified with maleic anhydride. The resulting polypropylene was examined by an infrared absorption spectrum to determine the quantity of the maleic anhydride contained therein, and it was found that 3.0% by weight of maleic anhydride was grafted onto the polypropylene.

A composition of 1.5% by weight of the modified polypropylene, 53.5 % by weight of polypropylene having a MI of 4.0, and 45% by weight of clay having an average particle size of $1\mu$ (the modifier monomer was in a quantity of 0.1 part by weight based on 100 parts be weight of the filler) was melt-extruded on the both surfaces of the sheet longitudinally stretched 5 times from (1) through an extruder set at a temperature of 270°C to produce a laminated sheet, after which the laminated sheet was stretched 7.5 times in the transverse direction to produce a synthetic paper. As a comparative example, a synthetic paper without addition of the modified polypropylene was prepared under the same conditions.

The results are shown in Table 1 dusting trouble. The samples, 2, 4 and 6 denoted herein are synthetic papers containing no modified polypropylene.

Table 2

| Sample | Transverse stretching temperature | Thickness | Microvoid content % | Property Opacity % | Property Whiteness % | No. of sheet in continuous offset printing | Ink Transfer* |
| --- | --- | --- | --- | --- | --- | --- | --- |
| 1 | 140 | 105 | 45 | 96 | 94 | 5,000 | ◎ |
| 2 | 140 | 106 | 45 | 96 | 94 | 500 | ◎ |
| 3 | 155 | 105 | 15 | 93 | 92 | 5,000 | ○ |
| 4 | 155 | 105 | 15 | 93 | 92 | 1,000 | ○ |
| 5 | 160 | 108 | 10 | 90 | 90 | 5,000 | △ |
| 6 | 160 | 108 | 10 | 90 | 90 | 4,000 | △ |

\* ◎ Excellent
○ Good
△ Fair

However, a synthetic paper having a microvoid content of less than 10% is poor in ink transfer which renders itself useless as a printing paper. It is most preferable for practical purposes that a synthetic paper with a microvoid content of at least 10% be improved with respect to dusting trouble by the addition of the modified polypropylene thereto.

Table 1

| | Example | Comparative example |
| --- | --- | --- |
| Thickness Substrate layer | 50 $\mu$ | 50 $\mu$ |
| Paperlike layer | 25 $\mu$ × 2 | 25 $\mu$ × 2 |
| Opacity | 95% | 95% |
| Whiteness | 94% | 94% |
| Offset printability | continuous printing of more than 5,000 sheets causes no dusting trouble. | continuous printing of 500 sheets causes dusting trouble. |

Example 2

100 parts of a composition comprising 65 % by weight of polypropylene having a MI of 0.6, 5% by weight of high density polyethylene (HD/PE) having a MI of 2, and 30 % by weight of clay having an average particle size of 1 $\mu$ was mixed with 1 part of BPO and 2 parts of maleic anhydride and reacted together in a molten state at a temperature of 230°C for 3 minutes, and, thereafter, the resulting reaction product was pelletized. The polymer composition was leached with xylene to separate the resin from the filler. The separated resin was examined by means of an infrared absorption spectrum to determine the quantity of the maleic anhydride contained therein, and the result was 0.03 % by weight (the modifier monomer being in a quantity of 0.07 part based on 100 parts of the filler). The pellet was melt-extruded through an extruder at a temperature of 270°C to produce a non-stretched sheet.

The non-stretched sheet was heated to a temperature of 145°C and stretched 5 times in the longitudinal direction and further stretched 8 times in the transverse direction at a temperature of 140° to 160°C to produce an opaque synthetic sheet. As a control, a synthetic paper without the modified polypropylene was prepared under the same conditions. The properties of these synthetic papers are shown in Table 2. As is apparent from Table 2, the synthetic paper having a high content of microvoid was highly improved in dusting trouble with the addition of the modified polypropylene, while with the synthetic paper having a microvoid content of not greater than 10% the addition of the modified polypropylene affords little improvement in

Example 3

1. 75% by weight of popypropylene having a MI of 1.0 was mixed with 10% by weight of HD/PE and 15% by weight of clay having an average particle size of 1$\mu$. After being milled in an extruder, the resulting mixture was melt-extruded through the extruder and cooled to prepare an unstretched sheet. After being heated to a temperature of 140°C, the sheet was stretched 5 times in the longitudinal direction to obtain a longitudinally stretched film.

2. 100 parts of polypropylene having a MI of 0.6, 10 parts of acrylic acid and 5 parts of benzoyl peroxide were reacted together in a medium of 600 parts of xylene (all parts being by weight) at a temperature of 120°C for 5 hours. The resulting polymer was reprecipitated with a large excess of acetone to obtain a powdery modified polypropylene. The resulting polymer was quantatively analized for its acrylic acid content by means of an infrared absorption spectrum. The result was 45% by weight. 1.0 % by weight of the modified polypropylene thus obtained, 49% by weight of polypropylene having a MI of 4.0, 5% by weight of HD/PE having a MI of 1.5, 40% by weight of clay having an average particle size of 1 $\mu$, and 5% by weight of diatomaceous earth having an average particle size of 4.5 $\mu$ were mixed together. After being milled in an extruder, the resulting mixture was melt-extruded on the both surfaces of the film obtained from (1) through an extruder to produce a laminated film. After being heated to a temperature of 150°C, the film was stretched 7 times in the transverse direction to obtain an opaque film.

The resulting opaque film was made antistatic by surface treatment and tested for printability.

The results of the test revealed that this film was improved with respect to dusting trouble to a degree of about 6 times as compared with a comparative example using no modified polyprolyne.

Table 3

|  |  | Example | Comparative example |
|---|---|---|---|
| Thickness | Substrate layer | 60 μ | 60 μ |
|  | Paperlike layer | 25 μ × 2 | 25 μ × 2 |
| Opacity |  | 95 | 95 |
| Whiteness |  | 94 | 94 |
| Offset printability |  | continuous printing of more than 5,000 sheets in possible | continuous printing of 800 sheets causes dusting trouble |

Example 4

1. Polypropylene having a MI of 0.8 was mixed with 5% by weight of clay having an average particle size of 1 μ. After being milled in an extruder set at a temperature of 270°C, the resulting mixture was melt-extruded through an extruder and cooled by means of a cooling device to prepare an unstretched sheet. After being heated to a temperature of 140°C, the sheet was stretched 5 times in the longitudinal direction.

2. Various mixtures containing the modified polypropylene (having a maleic acid content of 3.0% by weight and a MI of 50) obtained in Example 1 in the quantities indicated in the following Table 4 were prepared.

Table 4

| | Polypropylene (MI 4.0) | Modified Polypropylene | Clay (particle size; 1μ) | Quantity of polymerized modifier monomer based on 100 parts by weight of filler |
|---|---|---|---|---|
| | wt.% | wt.% | wt.% | part by weight |
| A | 54.85 | 0.15 | 45 | 0.01 |
| B | 54.4 | 0.6 | 45 | 0.04 |
| C | 53.5 | 1.5 | 45 | 0.1 |
| D | 40.0 | 15 | 45 | 1 |
| E | 17.5 | 37.5 | 45 | 2.5 |
| F | 55 | 0 | 45 | 0 |

These mixtures were melt-extruded on the both surfaces of the sheet obtained from (1) through an extruder set at a temperature of 270°C to produce laminated sheets, and the resulting laminated sheets were then stretched 7.5 times in the transverse direction to obtain synthetic papers. The evaluation results of these synthetic papers are shown below.

It is apparent from the results shown in the above Table that the quantity of the polymerized modifier monomer is preferably more than 0.01 part by weight based on 100 parts of the filler from the standpoint of printability, while it is preferably less than 2.5 parts by weight based on 100 parts of the filler from the standpoint of stretching stability. Most preferably, the quantity of the modifier monomer is in the range from 0.05 to 1 parts by weight based on 100 parts by weight of the filler.

In addition, the term "microvoid content" as herein used is determined by the following definition: microvoid content(%) = (specific gravity of film before stretching)-(specific gravity of film after stretching)/(specific gravity of film before stretching)

We claim:

1. A synthetic paper improved with respect to dusting trouble comprising a paperlike layer, of a microvoid content of at least 10 % comprising a stretched film of an olefin polymer composition with inorganic fillers mixed therein, wherein a part of said olefin polymer is an olefin polymer onto which a modifier monomer selected from the group consisting of ethylenically unsaturated carboxylic acids, their anhydrides, esters, and amides has been graft copolymerized.

2. A synthetic paper as claimed in claim 1 in which the content of the grafted modifier monomer is 0.01 to 2.5 parts by weight based on 100 parts by weight of the inorganic filler.

3. A synthetic paper as claimed in claim 1 in which said modifier monomer is an ethylenically unsaturated carboxylic acid selected from the group consisting of acrylic acid, maleic acid, and itaconic acid.

4. A synthetic paper as claimed in claim 1 in which said modifier monomer is an ethylenically unsaturated carboxylic acid anhydride which is maleic anhydride.

5. A synthetic paper as claimed in claim 1 in which said modifier monomer is an ethylenically unsaturated carboxylic acid ester which is an acrylic ester.

6. A synthetic paper as claimed in claim 1 in which said modifier monomer is an ethylenically unsaturated carboxylic acid amide which is acrylamide.

7. A synthetic paper as claimed in claim 1 in which said olefin polymer is selected from the group consist-

|  |  | A | B | C | D | E | F |
|---|---|---|---|---|---|---|---|
| Thickness | substrate layer | 50μ | 50μ | 50μ | 50μ | 50μ | 50μ |
|  | paperlike layer | 25μ× 2 | 25μ× 2 | 25μ× 2 | 25μ× 2 | 25μ× 2 | 25μ× 2 |
| Opaqueness |  | 95 | 95 | 95 | 95 | 95 | 95 |
| Whiteness |  | 94 | 94 | 94 | 94 | 94 | 94 |
| Offset printability |  | 1000 sheets | 4,000 | 5,000 | 5,000 | 5,000 | 500 |
| Stretching stability* |  | ◉ | ◉ | ◉ | ○ | △ | ◉ |

* ◉ Excellent
  ○ Good
  △ Fair ing of α-olefin homopolymers, propylene-ethylene copolymers, and mixtures thereof.

8. A synthetic paper as claimed in claim 6 in which said α-olefin homopolymer is selected from the group consisting of polyethylene, polypropylene, and polybutene-1.

9. A synthetic paper as claimed in claim 1 in which said inorganic filler is selected from the group consisting of aluminum silicate, titanium oxide, barium sulfate, calcium carbonate, silica, alumina, silicates, and magnesium carbonate.

10. A synthetic paper as claimed in claim 1 in which said synthetic paper consists solely of said paperlike layer.

11. A synthetic paper as claimed in claim 1 in which said synthetic paper is of a laminated structure in which said paperlike layer is secured to at least one surface of a substrate layer.

12. A synthetic paper as claimed in claim 11 in which said paper-like layer is secured to both surfaces of said substrate layer.

* * * * *

UNITED STATES PATENT OFFICE
CERTIFICATE OF CORRECTION

Patent No. 3922427              Dated November 25, 1975

Inventor(s)  TOYODA et al

It is certified that error appears in the above-identified patent and that said Letters Patent are hereby corrected as shown below:

Change assignees to read:

Oji Yuka Goseishi Kabushiki Kaisha and

Mitsubishi Petrochemical Co., Ltd.

Signed and Sealed this thirteenth Day of April 1976

[SEAL]

Attest:

RUTH C. MASON
Attesting Officer

C. MARSHALL DANN
Commissioner of Patents and Trademarks